United States Patent
Li et al.

(10) Patent No.: US 9,935,839 B2
(45) Date of Patent: Apr. 3, 2018

(54) DISPLAY DATA CHANNEL SNOOPING SCHEME FOR RETIMERS

(71) Applicant: Parade Technologies, Ltd., George Town, Grand Cayman (KY)

(72) Inventors: Qing Li, Shanghai (CN); Ming Qu, San Jose, CA (US); HongQuan Wang, Shanghai (CN); Zhengyu Yuan, San Jose, CA (US)

(73) Assignee: PARADE TECHNOLOGIES, LTD., George Town, Grand Cayman (KY)

( * ) Notice: Subject to any disclaimer, the term of this patent is extended or adjusted under 35 U.S.C. 154(b) by 211 days.

(21) Appl. No.: 15/060,295

(22) Filed: Mar. 3, 2016

(65) Prior Publication Data

US 2017/0257273 A1    Sep. 7, 2017

(51) Int. Cl.
H04L 12/24    (2006.01)

(52) U.S. Cl.
CPC ...... H04L 41/0866 (2013.01); H04L 41/0803 (2013.01)

(58) Field of Classification Search
CPC ......................... H04L 41/0866; H04L 41/0803
See application file for complete search history.

(56) References Cited

U.S. PATENT DOCUMENTS

| | | | | |
|---|---|---|---|---|
| 9,787,937 B1* | 10/2017 | Hung | ........... | H04N 7/0122 |
| 2006/0227736 A1* | 10/2006 | Conyers | ........... | H04L 47/15 370/328 |
| 2007/0189176 A1* | 8/2007 | Milne | ........... | H04L 43/00 370/241 |
| 2007/0192469 A1* | 8/2007 | Gentieu | ........... | H04L 12/66 709/223 |
| 2007/0206509 A1* | 9/2007 | Vedanabhatla | ........... | H04L 43/067 370/252 |
| 2007/0220357 A1* | 9/2007 | Vedanabhatla | ........... | H04K 3/46 714/43 |
| 2008/0150923 A1* | 6/2008 | Chen | ........... | G09G 5/006 345/204 |
| 2009/0300232 A1* | 12/2009 | Chen | ........... | G09G 5/003 710/33 |
| 2011/0149796 A1* | 6/2011 | Qu | ........... | G06F 3/14 370/254 |
| 2011/0260979 A1* | 10/2011 | Zhou | ........... | G06F 1/26 345/168 |

* cited by examiner

*Primary Examiner* — Oanh Duong
(74) *Attorney, Agent, or Firm* — Morgan, Lewis & Bockius LLP

(57) ABSTRACT

A source device communicates with a sink device over a main communication channel and configuration data is sent over a display data channel. A retimer is coupled between the source device and the sink device to improve the quality of signal transmitted from the source device to the sink device. The retimer monitors the data being sent on the display data channel to look for a desired command. Once the command is found, a copy of the command is decoded by the retimer and the configuration data and associated values are stored in a storage. The retimer uses the stored configuration data to modify the received communication data signal to match the operational characteristics between the source device and sink device and then transmit the modified signal to the sink device using these operational characteristics.

17 Claims, 4 Drawing Sheets

SCDCS – TMDS Configuration

| Offset | Bit 7 | Bit 6 | Bit 5 | Bit 4 | Bit 3 | Bit 2 | Bit 1 | Bit 0 |
|---|---|---|---|---|---|---|---|---|
| 0x20 | Rsvd(0) | Rsvd(0) | Rsvd(0) | Rsvd(0) | Rsvd(0) | Rsvd(0) | TMDS_Bit_Clock_Ratio | Scrambling_Enable |

TMDS_Bit_Clock_Ratio

0 = (TMDS Bit Period/TMDS Clock Period) ratio is 1/10
1 = (TMDS Bit Period/TMDS Clock Period) ratio is 1/40

FIG. 3

DISPLAY DATA CHANNEL SNOOPING SCHEME FOR RETIMERS

1. FIELD OF ART

The disclosure generally relates to loss compensation circuits for a communication interconnect, and in particular to a retimer device for interfacing with digital audio and video.

2. BACKGROUND

Interconnections for electronic systems continue to provide increased bandwidth and improved functionality to serve the computing demands of highly integrated computing devices. For example, devices including set-top boxes, mobile phones, and tablet computers now employ high bandwidth interconnect to access high resolution audio and video content. Many of these interconnect technologies support multiple legacy data rates along with high speed modes operating at data rates of 6 Gigabits per second (Gbps) and higher. The quality of data transmission at these rates often degrades due to transmission channel loss caused by the material and geometry of the transmission line.

To compensate for signal degradation due to channel loss, many interconnect technologies use loss compensation devices along the transmission channel. Loss compensation devices operate at the physical layer to improve data transfer rate by modifying certain aspects of the physical layer signal or regenerating the physical layer signal to improve signal quality. For interconnect technologies that employ both physical layer and link layer functionality, many loss compensation devices also include functionality to handle data path management, power state management, and other link layer functionality. The processing of link layer signals adds additional complexity and increases power consumption for loss compensation architectures that employ such features. Loss compensation techniques employing simpler architectures, however, lack the ability to determine system status. Unaware of the system status, these simpler interconnect systems may limit the ability of the loss compensation circuit to accurately replicate the signal characteristics of the source device.

SUMMARY

Various embodiments provide systems and methods for using a retimer device to compensate for data transmission channel loss for interconnection systems, such as a source device and a sink device connected by a High-Definition Multimedia Interface (HDMI) interconnect. HDMI interconnects support the transfer of video and/or audio from a source device, such as a computer, a digital video disk (DVD) player or a digital video recorder (DVR), to a sink device, such as a television, a home theater system or a computer monitor. HDMI interconnects use two channels, a main lane and a Display Data Channel (DDC) for communication between source device and sink device. The main lane serially transmits audio, video and clock signals at rates between 250 Megabits per second (Mbps) to 6.0 Gbps. The DDC carries management and device control data for establishing a communication link over the main lane or configuring how information is communicated between devices over the main lane by allowing the sink to communicate its display output capabilities back to the originating source device.

The disclosed retimer architecture monitors the DDC for specified configuration data, captures the specification configuration data, decodes the captured configuration data, and employs a specified retimer operation mode in accordance with the decoded configuration data. In particular, the disclosed retimer architecture includes a controller that decodes a Status and Control Data Channel (SCDC) read/write command. By detecting SCDC ID write commands, the controller may detect configuration data without interrupting DDC communication between the source device and the sink device. Accordingly, the disclosed retimer architecture eliminates circuitry typically used in HDMI retimers for decoding and processing high speed data.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

FIG. 3 is a flow chart illustrating a process for switching operational states of a retimer device of FIG. 1, according to an embodiment

DETAILED DESCRIPTION

A system and method for configuring a data transmission channel including a retimer device coupled to a source device and a sink device are described herein. For purposes of explanation, numerous specific details are set forth to provide a thorough understanding of the disclosed embodiments. It will be apparent, however, to one skilled in the art that the disclosed embodiments can be practiced without these specific details. In other instances, structures and devices are shown in block diagram form to avoid obscuring the disclosed embodiments.

Reference will now be made in detail to several embodiments, examples of which are illustrated in the accompanying Figures. It is noted that wherever practicable similar or like reference numbers may be used in the figures and may indicate similar or like functionality. The Figures depict embodiments for purposes of illustration only. One skilled in the art will readily recognize from the following description that alternative embodiments of the structures and methods illustrated herein may be employed without departing from the principles described herein.

Interconnect System Architecture

Figure 1:
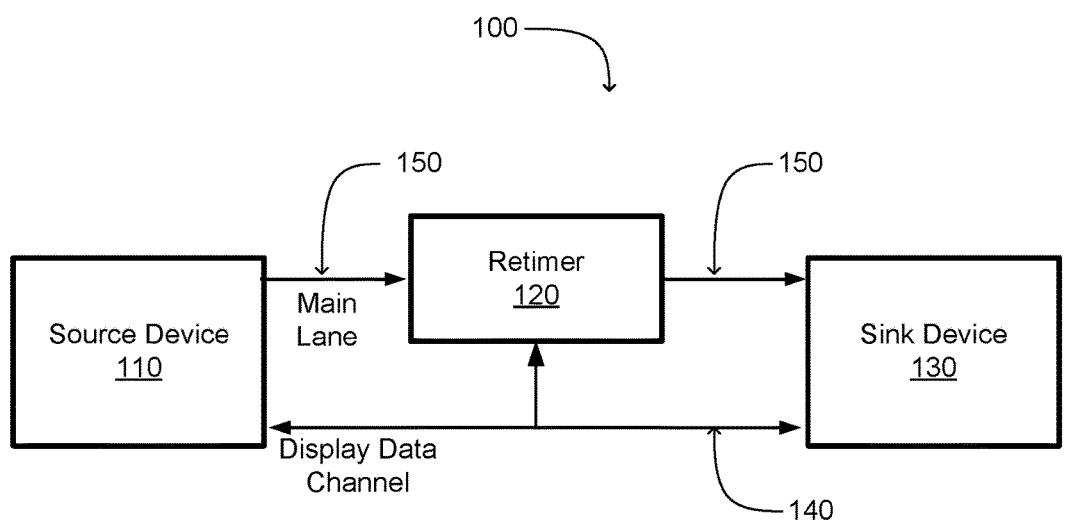
FIG. 1 is a block diagram of an interconnect system including a retimer, according to an embodiment.

FIG. 1 illustrates one embodiment of an interconnect system 100 including a source device 110 and a sink device 130 coupled to communicate via a display data channel (DDC) 140 and a main lane 150, in accordance with one embodiment. In an embodiment, the system 100 also includes a retimer device 120 which is coupled to the source device 110 and the sink device 130. The source device 110 is a computing device or system that transmits one or a combination of audio and video data for display and processing on another computing device. Example source devices include a digital video recorder (DVR), a digital video disk player (DVD) player, a computer, game console, set-top box, mobile phone, tablet computer, laptop computer, digital camera, or storage device. The source device 110 includes two ports, a main lane port and a DDC port. The main lane port is coupled to transmit data onto the main lane 150 communication channel, and the DDC port is coupled to transmit and receive data from the DDC 140. In the system 100, the source device 110 is the master device and the sink device 130 is the slave device. In operation, the source device 110 initiates communication with a sink device 130 and also modifies characteristics of the main lane 150 communication channel between source device 110 and sink device 130.

The sink device 130 receives one or a combination of video or audio data. Example sink devices include a television (TV), a computer monitor, a home theater system or other devices which receive and process audio or video data. In the embodiment shown in FIG. 1, the sink device 130 includes two ports. A main lane port coupled to receive data from the main lane 150 communication channel, and a DDC port coupled to transmit and receive data from the DDC 140. Although the sink device 130 is the slave device, the sink device 130 may also initiate main lane 150 configuration by sending data to the source device 110 over the DDC 140. For example, in an embodiment, the sink device 130 prompts the initiation of main lane 150 configuration by sending a request to the source device 110 for reading a status of a source device register (i.e., a status check read for a scrambling enable status or a timing parameter).

The retimer device 120 relays communication between the source device 110 and the sink device 130 to compensate for signal losses along the transmission data path between the source device 110 and the sink device 130. In an embodiment, a retimer device 120 is coupled between the source device 110 and the sink device 130. The retimer device 120 receives video/audio data on the main lane 150 from the source device 110 and monitors the DDC 140 to capture configuration data. Using the captured configuration data, the retimer device 120 modifies the signal received by the retimer device 120 and retransmits the modified signal. In some implementations, the retimer device 120 modifies the received signal by recovering the clock from the transmitted signal and retiming the received signal with the recovered clock. Additionally, the retimer device 120 may further modify the received signal by employing signal conditioning techniques, such as input equalization and output filtering. By modifying and retransmitting the signal, the retimer device 120 may extend the reach of the transmitted signal and remove undesirable transmission line effects, such as jitter, crosstalk, and reflections. Additionally, by retiming and retransmitting the signal, the retimer device 120 allows higher speed data transmission on the main lane 150 as compared to data transmission using the signal originally received by the retimer device 120. For example, the retimer device 120 receives an input signal from the source device 110 via the main lane 150 to be transmitted at a high speed (e.g., 18 Gbps) to the sink device 130. To avoid signal loss, the retimer device 120 is configured to have parameter settings similar to the source device 110. The manufacturer of the source device 110 may configure some of the parameter settings such as the device id, unique identifiers, or other such settings during the manufacturing process. Some other parameter settings may be adjustable and may be configured by a user. When a user selects a supporting feature on a source device, the software on the source device 110 may determine the corresponding parameter setting and store the parameter setting as a single or multi-bit value in a register or other storage component of the source device 110. For example, when a user selects a feature that causes data to be sent at a transition-minimized differential signaling (TMDS) bit rate greater than 3.4 Gbps, a scrambler is enabled by the source device 110 via setting a scrambling_en bit. The setting of the bit indicates to the sink device 130 and the retimer device 120 to set the scrambling_en bit in the respective devices to appropriately transmit or condition the data being transmitted via the main lane 150 or DDC channel 140. The parameter settings are intercepted by the retimer device 120 from the DDC 140, and then the retimer device 120 modifies the received signal from the source device 110 based on the intercepted parameters. Modifying the received signal may include amplifying, removing jitter, improving the signal to noise ratio, equalizing or performing any other such modification or signal conditioning technique. Example parameter settings include bit clock ratio, scrambling control signal, scrambler status signal and other such settings. The modified signal is then transmitted from the retimer device 120 to the sink device 130 using the main lane 150. The modified signal includes less signal distortion compared to the received signal, while maintaining all the data components of the received signal transmitted by the source device. The data signal received by the sink device 130, thus has signal characteristics similar to the signal transmitted from the source device 110. Example signal characteristics include amplitude, signal to noise ratio, frequency, phase, and jitter. Thus, the retimer device 120 allows transmission of audio and/or video data having data rates that exceed a threshold data rate when the source device 110 and the sink device 130 are separated by a threshold distance and without a retimer device 120 coupled between them.

The DDC 140 is a bi-directional communication link which exchanges point to point dynamic data for establishing or configuring the main lane 150 between the source device 110 and the sink device 130. For example, the DDC 140 makes use of the industry standard I$^2$C protocol for communication, and extends the standard by providing a mechanism for the sink device 130 to request a source device 110 to initiate a status check read. The status check read allows the source device 110, and in turn the sink device 130 to determine the status of the TMDS configuration and/or control data. Using TMDS allows transmission of high speed data over the main lane 150. The TMDS bit rate is configurable. Once a particular TMDS bit rate is selected, the corresponding control/configuration parameters such as clock ratio and scrambler setting parameters may be selected to enable accurate and high speed data transmission between the source device 110 and sink device 130. The status check read command, when invoked, queries the target device for the aforementioned TMDS parameter settings, and returns the TMDS parameter setting values.

In an embodiment, the DDC 140 carries commands sent from the source device 110 to read the extended display identification data of the sink device 130, to learn what the audio/video formats supported by the sink device 130 supports. The DDC 140 also carries commands from the source device 110 to check the validity and status of the main lane 150 to reconfigure how data is communicated over the main lane 150 between the source devices 110 and the sink device 130.

As the DDC 140 communicates configuration and/or control data, the main lane 150 transmits one or a combination of audio and video data from the source device 110 to the sink device 130. The main lane 150 is a uni-directional communication channel which transmits audio or video data from source device 110 to sink device 130. For example, the main lane 150 comprises one or more AC-coupled, doubly-terminated differential pairs, commonly referred to as "lanes." In an embodiment, the main lane 150 supports data rates between 250 (Mbps) to 6.0 Gbps. In one embodiment, the main lane 150 transmits audio and video data that conforms to the HDMI 2.0 standard. The HDMI 2.0 standard supports transmission of data rates up to a maximum of 18.0 Gbps. The control or configuration data, which may be time insensitive data, is transmitted on a second channel, for example, the DDC channel 140. Data transmitted on the DDC channel 140 is monitored by the retimer device 120 to identify specified configuration parameters, while disregarding other data. The specified parameters include parameter related to signaling characteristics of the communication data transmitted by the source device 110. The retimer device 120 uses the specified parameters to modify the communication data signal received from the source device 110 and retransmit the modified communication data signal to the sink device 130, such that the retransmitted signal has signal characteristics matching those the original communication data signal transmitted from the source device 110. The maintenance of signal quality is done by the retimer device 120 and the device configuration parameters are transmitted over the DDC channel 140. Hence, the main lane 150 allows for high-speed transmission of audio or video data from source device 110 to sink device 130 without link or device configuration or maintenance data.

Figure 2:
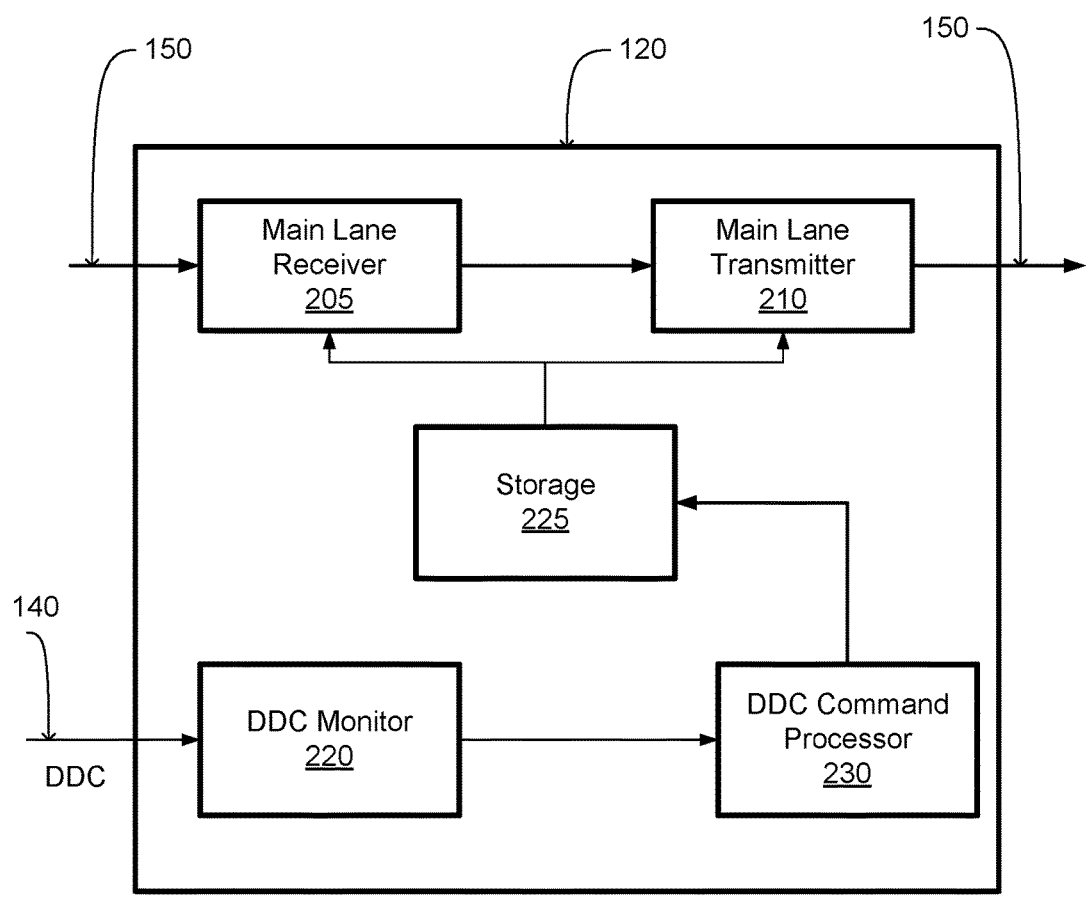
FIG. 2 is a block diagram illustrating a detailed view of a retimer device of FIG. 1, according to an embodiment.

FIG. 2 is a block diagram illustrating a detailed view of the retimer device 120, according to an embodiment. The retimer device 120 comprises a main lane receiver 205, a main lane transmitter 210, a DDC monitor 220, a DDC command processor 230, and storage component 225. However, in other embodiments, the retimer device 120 includes different and/or additional components than the ones shown in FIG. 2.

In one embodiment, a main lane receiver 205 receives audio and/or video data from the main lane 150. The main lane receiver 205 may include serializer/deserializer logic, a clock and data recovery circuit, deskew circuits, programmable receiver equalization, decoders, and other video and audio capture and processing circuitry. The main lane receiver 205 operates without the use of a crystal or an external clock reference. Additionally, the main lane receiver 205 can receive configuration data packets from the main lane 150 to establish communication settings, preferred clock rates, and force actions between the source device 110 and the sink device 130. Example configuration data include operating mode settings such as the alternating current (AC) parameters and the direct current (DC) parameters that the sink device 130 operates on. Additionally the configuration data may include TMDS bit rate settings that the source device 110 operates on and may request the sink device 130 to operate at the same settings. The main lane receiver 205 is coupled to a main lane transmitter 210, which receives the audio and/or video data from the receiver 205. The main lane transmitter 210 may include one or more of pre-emphasis circuitry that compensates for any signal loss due to attenuation during transmission or any other such distortion of signal, an amplifier, a serializer, a driver and other such components. In one implementation, an output voltage and termination of the driver may be adjusted manually or automatically based on the main lane data transmission rate. The main lane transmitter 210 accesses the configuration data from the storage component 225 to reconfigure the audio and/or video data or the configuration data. Reconfiguration of the incoming data at the main lane transmitter 210 includes retiming the data signals to eliminate jitter and to fix the skew, thus providing a clean version of the data signals. The reconfiguration of the incoming data is performed by accessing the configuration parameters stored in the storage component 225 of the retimer device 120. The reconditioned (i.e., modified) audio and/or video data is transmitted to the sink device 130, or other device, using the main lane 150.

Additionally, the retimer 120 includes a DDC monitor 220 which is coupled to the DDC 140 and to a DDC command processor 230. The DDC monitor 220 passively monitors data transmitted via the DDC 140 and communicates the received data to the DDC command processor 230. Example data monitored by the DDC monitor 220 may include a display data channel command as shown in FIG. 3. FIG. 3 is an exemplary display data channel command processed by the retimer device 120 of FIG. 1, according to an embodiment. The display data channel command shown in FIG. 3 is referred to a SCDCS-TMDS configuration, which allows configuring the bit rate for transmission of audio and video data from the source device 110 to the sink device 130. The fields of the SCDCS-TMDS configuration command allow configuring the bit period or the TMDS clock period for the transmission of data on the main lane 150, and associated scrambling enable bi that allows enabling or disabling of the scrambler. The SCDCS-TMDS configuration command includes primarily two fields—TMDS Bit_Clock_Ratio and Scrambling_enable. The TMDS Bit_Clock_Ratio is the ratio of the TMDS bit (i.e. encoded data bit) to the TMDS clock. Based on a TMDS character rate, the TMDS clock rate and bit rate for the TMDS link is determined. For example, the TMDS clock rate is one fourth of the TMDS character rate when the character rates are above 340 Mcsc, and the bit rate remains 10 times the TMDS character rate. Hence the bit rate to clock ratio is 1/40 in this case. This ratio determines the clock rate and the bit rate that the TMDS link must operate on, for error-free data transmission. Similarly, for a bandwidth range from 3.4 Gbps up to 6 Gbps, a scrambler is enabled by the source device 110 that scrambles the data before transmission over the main lane 150. The Scrambling_en bit is set by the source device 110, to indicate the sink device 130 that data being transmitted is scrambled, and hence the sink device 130 must unscramble the data before further processing it.

The source device 110 may select the TMDS Bit_Clock_Ratio value based on the clock ratio that the sink device 130 can support. The source device 110 may further select setting or resetting a scrambling function while sending the data to the sink device 130. Such configuration commands are intercepted by the DDC monitor 220 and processed by the DDC command processor 230 as later described. The decoded field names such as "TMDS_Bit_Clock_Ratio and Scrambling_Enable along with their associated values are stored in the storage component 225. These values are retrieved by the retimer device 120 when sending data from the source device 110 to the sink device 130 via the main lane 150.

Returning to FIG. 2, a DDC monitor 220 passively listens and intercepts the data transmitted between the source device 110 and the sink device 130 on the DDC 140. During the monitoring, when the DDC monitor 220 detects the command indicating that the retimer 120 desires to configure the main lane transmitter 210 and the main lane receiver 205, the DDC monitor 220 sends the detected commands to a storage 225. Such a scheme allows the DDC monitor 220 to non-intrusively monitor data transmitted via the DDC 140 and capture data transmitted without disrupting actual transmission of data between source device 110 and sink device 130 via the DDC 140. In one embodiment, the DDC monitor 220 generates a copy of data transmitted through the DDC 140 without altering or delaying transmission of data between source device 110 and sink device 130.

The DDC command processor 230 compares data received from the DDC monitor 220 with stored information describing DDC data types and/or commands to identify a subset of the transmitted data for further processing. Example DDC data types may include a data read command such as an extended display identification data (EDID) information read for a sink device 130, or a configuration command such as a TMDS configuration command that is sent as an SCDC device write command, or a data write command. A subset of this information may include information related to the maximum TMDS clock rate that the sink device 130 may support. The DDC command processor 230 compares this transmitted data or the subset of data to a previously stored set of TMDS configuration commands. In one embodiment, the monitored DDC data type or command may be stored in the storage component 225 and then the stored DDC data type or command may be compared with the previously stored set of TMDS configuration commands also stored in the storage component 225. In another embodiment, a portion of the monitored DDC data type or command may be matched to a predetermined TMDS configuration command bit. For example, the value of bit 5 of the monitored DDC command may be compared to an expected value of a SCDC command that indicates a SCDC device write command. If the monitored DDC data type or command matches the expected value indicating an SCDC device write command, the monitored DDC command may then be stored in the storage component 225. When the command matches the value that indicates an SCDC device write command, the monitored DDC command is further processed to decode the type of command (e.g., TMDS configuration command, status flags, AC link parameters command, etc.) and the fields of the command and their associated values. Thus, the DDC command processor 230 reduces the amount of captured data that is subsequently stored in the storage component 225 by limiting the captured data to include commands and associated data most relevant (e.g., the values of the AC link parameter settings) to configuring one or more main lane receiver 205 and/or main lane transmitter 210 settings in the retimer device 120.

The storage component 225 is coupled to the DDC command processor 225, to the main lane receiver 205, and to the main lane transmitter 210. Example storage components include a register, a flip flop, a memory device, or group of memory devices. Data or commands captured by the DDC command processor 230 are communicated to the storage component 225 as input. The main lane receiver 205 and the main lane transmitter 210 may access the storage component 225 to retrieve the configuration data to modify one or more of characteristics of the signal received by the respective components. This allows the main lane transmitter 210 to operate in conjunction with the main lane receiver 205 to generate a signal for transmission to the sink device 130 that has specified signal attributes matching those of the original signal output by the source device 110.

For example, the source device 110 transmits a SCDC device write command that includes the TMDS configuration command to the sink device 130 via the DDC 140. The TMDS configuration command includes fields that configure the link parameters for transmission of data from the source device 110 to the sink device 130. The DDC monitor 220 intercepts the SCDC device write command and the DDC command processor 230 decodes the TMDS configuration command. As a result of the decoding, the values for the TMDS_Bit_Clock_Ratio and the Scrambling_En are stored in the storage component 225. When data is transmitted on the main lane 150, the main lane transmitter 210 retrieves the values for the TMDS_Bit_Clock_Ratio and the Scrambling_En from the storage and configures the retimer device 120 to the retrieved values, thus adjusting the retimer device 120 transmission settings. Thus, by applying the configuration commands transmitted by the source device 110, the retimer device 120 is configured to modify the received signal from the source device 110 such that specified attributes of the modified signal are within threshold tolerances of the corresponding attributes of the original signal output by the source device 110. Thus, the configuration settings retrieved from the storage component 225 may be used as a basis to adjust one or more settings of the main lane transmitter 210 and the main lane receiver 205. The adjustment of the characteristics of the mail lane transmitter 210 and the main lane receiver 205 improves the quality of the audio or video data transmitted by the retimer 120 by reducing jitter and skew in the data or clock signals propagating on the main lane 150. This reconditioned data and/or clock signals are then sent to the sink device 130 via the main lane 150.

In various embodiments, the DDC monitor 220, the DDC command processor 230, and the storage component 225 comprise one or more processes executable by a processor (not shown) and/or one or more firmware applications. The process or processes may be executed by a microprocessor or controller, a field programmable gate array (FPGA), an application specific integrated circuit (ASIC) or a combination thereof particularly configured to execute such process or processes. In an embodiment, one or more of the DDC monitor 220, the DDC command processor 230, and the storage component 225 comprise a processor configured to process data describing events which may comprise various computing architectures including a complex instruction set computer (CISC) architecture, a reduced instruction set computer (RISC) architecture or an architecture implementing a combination of instruction sets. A single processor or multiple processors can be used to implement one or more of the DDC monitor 220, the DDC command processor 230 and the storage component 225.

For purposes of illustration, FIG. 2 shows the DDC monitor 220, the DDC command processor 230, and the storage component 225 as discrete functional components. However, in various embodiments, any or the entire functionality performed by DDC monitor 220, the DDC command processor 230, and the storage component 225 can be combined into single processing device to perform the functions of one or more of the above-described modules.

System Operation

Figure 4:
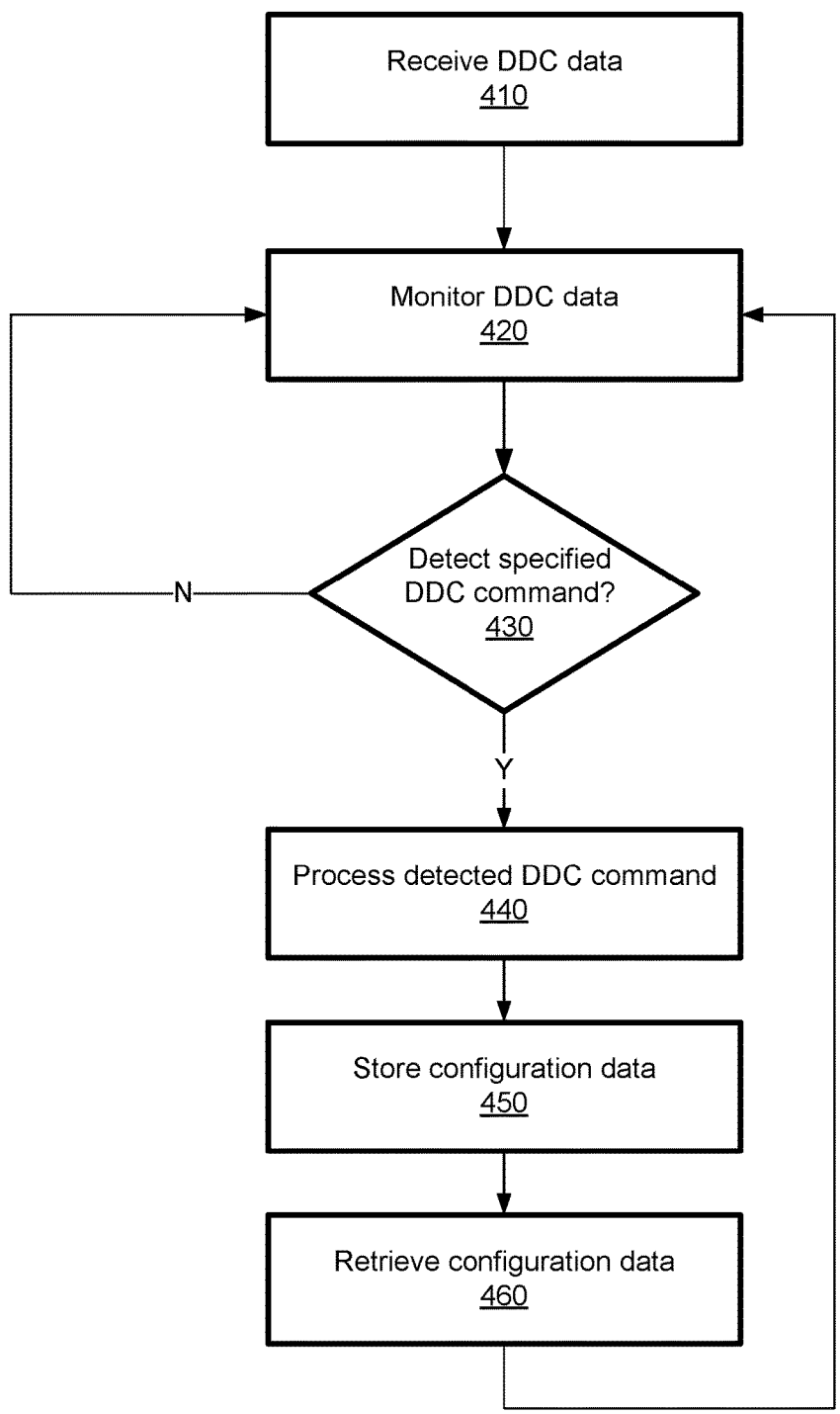
FIG. 4 is an exemplary display data channel command processed by the retimer device of FIG. 1, according to an embodiment.

FIG. 4 is a flow chart illustrating a process for switching operational states of a retimer device 120 of FIG. 1, according to an embodiment. Those of skill in the art will recognize that other embodiments can perform the steps of FIG. 3 in different orders or include different and/or additional steps than the ones described herein.

Initially, the source device 110 sends a command, or a pattern of commands indicating the start of communication between the source device 110 and the sink device 130 via the main lane 150. The DDC monitor 220 receives 410 an initialization message or initialization packet as input from the source device 110. After the command, or pattern of commands, indicating the start of communication, one or more commands are transmitted between the source device 110 and the sink device 130 using the DDC 140. The received commands are monitored 420 by the DDC monitor 220 and communicated to the DDC command processor 230 included in the retimer device 120. The DDC command processor 230 then interprets 430 the DDC commands as they are received. The DDC command processor 230 may decode a particular bit of the DDC command to evaluate if the monitored DDC command is an SCDC device write command (or any other predetermined command), or the DDC command processor may search a look up table of predetermined acceptable commands to find a match to the monitored DDC command. Thus, the DDC command processor 230 may identify different command types or identify the purpose of subsequent commands, for example, an SCDC device write command may be followed by a link configuration command.

After interpreting a received command, the DDC command processor 230 determines whether the received command matches 430 a specific command. For example, the DDC command processor 230 compares one or more values of a received command with stored values identifying a desired command. Examples of desired commands include a SCDC device write command, an SCDC TMDS configuration command or any other such command. Responsive to determining that a command is not associated with the stored values identifying a desired command, the DDC monitor 220 and DDC processor 430 enter an idle state, while the DDC monitor continues monitoring transmission of subsequent commands.

However, responsive to determining 430 a received command is associated with a stored value identifying a desired command, a replica of the received command is generated and is sent to the DDC command processor 230 for decoding. In one embodiment, the DDC command processor 230 processes 440 the received command by decoding it. The received command may have one or more fields, which may be set to different values. As a part of the decoding process, the DDC command processor 230 extracts the field names along with the set of values associated with it. Additionally, the DDC command processor 230 determines the type of command that was received. Example types of command include a configuration command, a data write command, a data read command, and other such types. The identified fields and the associated values are stored 450 in a storage component 225.

The operational characteristics stored in the storage component 225 match the operational characteristics of source device 110 and the sink device 130 obtained by intercepting the configuration data over the DDC channel 140. The main lane transmitter 210 then retrieves these stored configuration values to modify one or more operational characteristics of the retimer device 120, allowing modification of how the main lane transmitter 210 communicates data using the main lane 150. An example operational characteristic includes the TMDS clock. Thus, by intercepting a limited number of specified commands and storing the data associated with the intercepted commands, the TMDS clock rates that are stored in the storage component 225 are the same as the TMDS clock rates used by the source device 110 and the sink device 130. Accordingly, the data transmitted through the retimer device 120 is modified to align to the clock rate of source device 110 and the sink device 130. The reconditioned and retransmitted data provides a synchronized data and clock signal to the sink device 130, compensated for impairments caused by the transmission path between the source device 110 and the retimer device 120

After the modified data signal is sent to the sink device 130 via the main lane transmitter 210, the DDC monitor 220, DDC command processor 230, and the main lane transmitter 210 enter an idle state until data indicating the start of a new communication is received 320. This idle state reduces the power consumption of the DDC monitor 220, DDC command processor 230, and the main lane transmitter 210.

Additional Considerations

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

The foregoing description of the disclosed embodiments has been presented for the purposes of illustration and description. It is not intended to be exhaustive or to limit the present invention to the precise form disclosed. Many modifications and variations are possible in light of the above teaching. It is intended that the scope of the disclosed embodiments be limited not by this detailed description, but rather by the claims of this application. As will be understood by those familiar with the art, the present invention may be embodied in other specific forms without departing from the spirit or essential characteristics thereof. Likewise, the particular naming and division of the components, circuits, routines, features, attributes, methodologies and other aspects are not mandatory or significant, and the mechanisms that implement the present invention or its features may have different names, divisions and/or formats. Furthermore, as will be apparent to one of ordinary skill in the relevant art, the components, circuits, routines, features, attributes, methodologies and other aspects of the disclosed embodiments can be implemented in hardware with any combination firmware and software. Of course, wherever a component, an example of which is a module, of the disclosed embodiments is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosed embodiments are in no way limited to implementation in any specific programming language, or for any specific operating system or environment. Accordingly, the disclosure is intended to be illustrative, but not limiting, of the scope of the disclosed embodiments, which is set forth in the following claims.

What is claimed is:

1. A system for configuring communication between a source device and a sink device comprising:
   a main communication channel coupled between the source device and the sink device;
   a display data channel coupled to exchange configuration data between the source device and the sink device; and
   a retimer device coupled to receive communication data from the source device using the main communication channel, and coupled to receive configuration data from the source device using the display data channel;
   the retimer device configured to:
      identify at least one command included in configuration data that matches one or more previously stored commands retrieved by the retimer device,
      decode the identified at least one command,
      obtain one or more configuration settings from the decoded at least one command,
      modify the communication data in accordance with obtained one or more configuration settings, and
      output the modified communication data to the sink device.

2. The system of claim 1 wherein the configuration data comprises at least one of a transition-minimized differential signaling (TMDS) bit to clock ratio or scrambler circuit enable or disable indicator.

3. The system of claim 1 wherein the previously stored commands retrieved by the retimer device are retrieved from the display data communication channel during initialization of communication between the source device and the sink device.

4. The system of claim 1 wherein the retimer device comprises a receiver circuit, the retimer device further configured to set one or more parameters of the receiver circuit based on the one or more obtained configuration settings.

5. The system of claim 4 wherein the one or more parameters of the receiver circuit comprises a bit that enables or disables a scrambler circuit.

6. The system of claim 4 wherein the one or more parameters of the receiver circuit comprises a bit to clock ratio of the transition minimized differential signaling (TMDS) transmission.

7. The system of claim 1 wherein the retimer device comprises a transmitter circuit, the retimer device further configured to set one or more parameters of the transmitter circuit based on the one or more configuration settings.

8. The system of claim 7 wherein the one or more parameters of the transmitter circuit comprises amplification of the output signal.

9. The system of claim 1 wherein the configuration data captured from the display data channel comprises transition-minimized differential signaling (TMDS) configuration data.

10. The system of claim 9 wherein the TMDS configuration data comprises a TMDS bit clock ratio value.

11. A retimer device comprising:
   a receiver coupled to receive communication data from a source device using a main communication channel, and coupled to receive configuration data from the source device using a display data channel;
   a transmitter coupled to output of the receiver;
   a storage device coupled to the receiver and the transmitter; and
   a processing device coupled to the storage device, the processing device configured to:
      identify at least one command included in configuration data that matches one or more previously stored commands retrieved by the retimer device, decode the identified at least one command,
      obtain one or more configuration settings from the decoded at least one command, and
      store the obtained one or more configuration settings in the storage device;
   the receiver configured to retrieve a first set of the one or more configuration settings from the storage device and modify the received communication data based on the first set of the one or more configuration settings; and
   the transmitter configured to retrieve a second set of the one or more configuration settings from the storage device and modify communication data output from the receiver based on the second set of the one or more configuration settings.

12. The retimer device of claim 11 wherein the previously stored commands retrieved by the retimer device are retrieved from the display data communication channel during initialization of communication between the source device and the sink device.

13. The retimer device of claim 11 further configured to set one or more parameters of the receiver based on the first set of the one or more obtained configuration settings.

14. The retimer device of claim 13 wherein the one or more parameters of the receiver comprises a bit that enables or disables a scrambler circuit.

15. The retimer device of claim 13 wherein the one or more parameters of the receiver comprises a bit to clock ratio of the transition minimized differential signaling transmission.

16. The retimer device of claim 11 further configured to set one or more parameters of the transmitter based on the second set of the one or more obtained configuration settings.

17. The retimer of claim 16 wherein the one or more parameters of the transmitter circuit comprises amplification of the output signal.

* * * * *